(No Model.)
C. L. BELLAMY.
VEHICLE SPRING.
No. 497,487. Patented May 16, 1893.
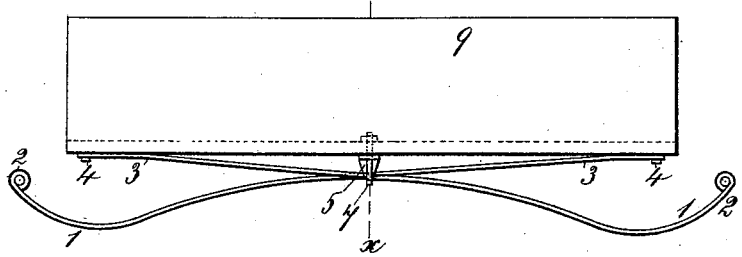
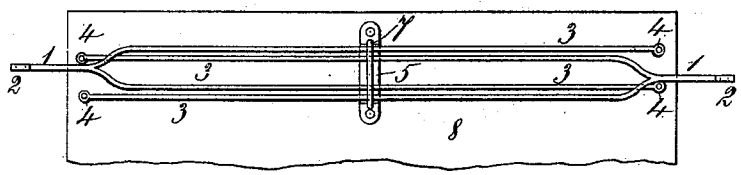
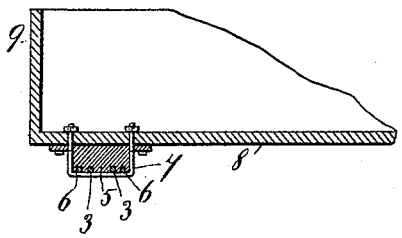
WITNESSES:
INVENTOR
C. L. Bellamy.
BY A. M. Pierce.
ATTORNEY

UNITED STATES PATENT OFFICE.

CHARLES L. BELLAMY, OF ARLINGTON, NEW JERSEY.

VEHICLE-SPRING.

SPECIFICATION forming part of Letters Patent No. 497,487, dated May 16, 1893.

Application filed September 28, 1892. Serial No. 447,125. (No model.)

*To all whom it may concern:*

Be it known that I, CHARLES L. BELLAMY, a citizen of the United States, residing at Arlington, in the county of Hudson and State of New Jersey, have invented a new and useful Improvement in Vehicle-Springs, of which the following is a specification.

My invention relates especially to springs employed upon light vehicles, and has for its object the provision of a cheap, durable and effective spring, which will accommodate itself to the load, and keep the vehicle body even, and wherein danger of breaking of the spring by reason of a sudden upward bound of the body of the vehicle, is overcome.

To attain the desired end, my invention consists essentially in a spring formed of two forked or divided parts, the extremities of the forks being arranged to engage with the vehicle body, or the equivalent, and the other extremity of each part of the spring being arranged to engage with side-bars, or the equivalent, the centers of the parts of the spring passing movably through a rigid projection from the bottom of the vehicle body, all of which will be hereinafter first fully described, and then pointed out in the claims.

In the accompanying drawings, Figure 1 is an end view of a vehicle body wherewith my spring is employed. Fig. 2 is a plan view, looking upward from below the vehicle body, showing the location and arrangement of all the parts. Fig. 3 is a vertical sectional view at line x—x of Fig. 1.

Like numerals of reference, wherever they occur, indicate corresponding parts in all the figures.

1 is the single portion of each part of the spring, provided with an eye, 2, for engaging with a side-bar, or the equivalent.

3, 3, are the forked parts, each extremity being provided with a bolt hole for the reception of a securing bolt, 4. 5 is a central bearing piece, cut out at 6 for the passage of the parts 3 of the spring, and having a securing yoke, 7, passing therearound, being firmly attached to the bottom 8, of the vehicle body, 9.

When constructed and arranged in accordance with the foregoing description, my improved spring will be found very effective. The parts are free to move longitudinally through the central securing and bearing block, which effectually prevents any too great upward bound of the vehicle body, when passing over rough places, and at the same time forms such a support as to act, in conjunction with the end connections of the spring to the body, to cause the said body to always keep a horizontal position, no matter upon what portion of the body the load may be placed.

Having now fully described my invention, what I claim as new therein, and desire to secure by Letters Patent, is—

1. A vehicle spring, in which are comprised two distinct sections, one end of each section being arranged to engage with side-bars, or the equivalent, and the other ends with the body of a vehicle, a central, rigid connection to the center of the vehicle body being provided, through which the parts of the spring pass, substantially as shown and described.

2. The combination with springs having a single portion at one end, and a forked portion at the other end, said forked portions passing each other as shown, of a central rigid bearing piece, substantially as set forth and described.

3. The combination with a spring formed of two bifurcated parts which cross each other, as set forth, of a rigid central bearing piece, arranged substantially as shown and described.

4. The combination with a spring, of a rigid central bearing connected to the vehicle body, and extending below the same substantially as shown and described.

5. The combination with a vehicle spring, of a central bearing, consisting of a block fixed to the vehicle body, and having a securing yoke therearound, substantially as shown and described.

6. A vehicle spring in which are comprised two bifurcated parts arranged to pass each other centrally, substantially as shown and described.

CHARLES L. BELLAMY.

Witnesses:
WM. H. WEIGHTMAN,
A. M. PIERCE.